(12) United States Patent
He

(10) Patent No.: US 10,059,222 B2
(45) Date of Patent: Aug. 28, 2018

(54) BATTERY TEMPERATURE ESTIMATION SYSTEM

(71) Applicant: FORD GLOBAL TECHNOLOGIES, LLC, Dearborn, MI (US)

(72) Inventor: Chuan He, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 754 days.

(21) Appl. No.: 14/253,158

(22) Filed: Apr. 15, 2014

(65) Prior Publication Data

US 2015/0291055 A1 Oct. 15, 2015

(51) Int. Cl.
| | |
|---|---|
| *B60L 11/18* | (2006.01) |
| *G10K 13/00* | (2006.01) |
| *G01K 13/00* | (2006.01) |
| *H01M 10/633* | (2014.01) |
| *H01M 10/625* | (2014.01) |
| *H01M 10/651* | (2014.01) |
| *H01M 10/65* | (2014.01) |
| *H01M 10/613* | (2014.01) |
| *H01M 10/48* | (2006.01) |

(52) U.S. Cl.
CPC ....... *B60L 11/1874* (2013.01); *B60L 11/1861* (2013.01); *G01K 13/00* (2013.01); *H01M 10/625* (2015.04); *H01M 10/633* (2015.04); *H01M 10/65* (2015.04); *H01M 10/651* (2015.04); *H01M 10/486* (2013.01); *H01M 10/613* (2015.04); *H01M 2220/20* (2013.01)

(58) Field of Classification Search
CPC combination set(s) only.
See application file for complete search history.

(56) References Cited

U.S. PATENT DOCUMENTS

| | | |
|---|---|---|
| 6,076,964 A | 6/2000 | Wu et al. |
| 6,377,880 B1 * | 4/2002 | Kato ..................... B60K 6/485 |
| | | 180/65.26 |
| 6,902,319 B2 | 6/2005 | Wu et al. |
| 7,767,354 B2 | 8/2010 | Saito et al. |
| 8,039,136 B2 | 10/2011 | Yamamoto et al. |
| 8,219,248 B2 | 7/2012 | Aridome et al. |
| 8,527,095 B2 | 9/2013 | Kikuchi et al. |
| 9,583,800 B2 | 2/2017 | Hwang et al. |
| 9,722,266 B2 | 8/2017 | Jeon et al. |
| 2006/0001399 A1 | 1/2006 | Salasoo et al. |
| 2013/0089758 A1 | 4/2013 | Tezuka et al. |

FOREIGN PATENT DOCUMENTS

| | | |
|---|---|---|
| CA | 2874632 A1 | 11/2013 |
| CN | 101479411 A | 7/2009 |
| CN | 102468505 A | 5/2012 |
| CN | 102569938 A | 7/2012 |
| CN | 102803006 A | 11/2012 |
| JP | 10992347 A | 4/1997 |
| KR | 20100063344 A | 6/2010 |
| WO | 9941819 A1 | 8/1999 |

OTHER PUBLICATIONS

Hu et al., Model-Based Calibration for Battery Characterization in HEV Applications, Jun. 2008, American Control Conference, pp. 318-325. <http://ieeexplore.ieee.org/xpl/articleDetails.jsp?arnumber=4586510>.

Fang et al., A Prediction Model Based on Artificial Neural Network for Surface Temperature Simulation of Nickel-Metal Hydride Battery During Charging, Feb. 2012, Beijing Key Laboratory of Environmental Science and Engineering, School of Chemical Engineering and Environment, Beijing Institute of Technology, Beijing, China. <http://www.sciencedirect.com/science/article/pii/S0378775312004193>.

\* cited by examiner

*Primary Examiner* — Ladan Mohaddes

(74) *Attorney, Agent, or Firm* — David Kelley; Brooks Kushman, P.C.

(57) ABSTRACT

A vehicle battery cooling system may include a cooling arrangement to cool a battery, and a controller programmed to operate the arrangement according to each of a series of estimated temperatures of the battery that are based on heat generation, stored thermal energy, and heat transfer rates associated with the battery such that the series forms an estimated temperature waveform that temporally leads a sensed temperature waveform of the battery.

12 Claims, 3 Drawing Sheets

BATTERY TEMPERATURE ESTIMATION SYSTEM

TECHNICAL FIELD

This disclosure relates to traction battery temperature estimation.

BACKGROUND

Vehicles such as battery-electric vehicles (BEVs), plug-in hybrid electric vehicles (PHEVs), mild hybrid—electrical vehicles (MHEVs), or full hybrid-electric vehicles (FHEVs) contain a traction battery, such as a high voltage ("HV") battery, to act as a propulsion source for the vehicle. The HV battery may include components and systems to assist in managing vehicle performance and operations. The HV battery may include one or more arrays of battery cells interconnected electrically between battery cell terminals and interconnector bus bars. The HV battery and surrounding environment may include a thermal management system to assist in managing temperature of the HV battery components, systems, and individual battery cells.

Because the life of a battery may be affected by the temperature of the battery cells, the thermal management system, and cooling systems thereof, may help to prevent the battery from overheating and to mitigate the effects of high temperatures. Such cooling systems may be triggered by a detected temperature at a battery sensor installed on the battery surface.

SUMMARY

A vehicle battery cooling system may include a cooling arrangement to cool a battery, and a controller programmed to operate the arrangement according to each of a series of estimated temperatures of the battery that are based on heat generation, stored thermal energy, and heat transfer rates associated with the battery such that the series forms an estimated temperature waveform that temporally leads a sensed temperature waveform of the battery.

A method for managing a temperature of a vehicle battery may include operating, by a controller, a cooling system to cool a battery in response to a series of estimated battery temperatures that are each based on heat generation, stored thermal energy, and heat transfer rates associated with the battery and that reflect changes in internal temperature of the battery prior to sensors reflecting changes in internal temperature of the battery to prevent the battery from exceeding an internal temperature threshold.

A vehicle may include a traction battery, a cooling system configured to cool the traction battery, and a controller programmed to operate the cooling system in response to a series of estimated battery temperatures that are each based on heat generation, stored thermal energy, and heat transfer rates associated with the battery and that reflect changes in internal temperature of the battery prior to sensors reflecting changes in internal temperature of the battery to prevent the battery from exceeding an internal temperature threshold.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a temperature prediction system configured to predict the change of stored thermal and electrical energy within a battery pack. By predicting this energy, the internal cellular temperature of the battery may be predicted without the use of temperature sensors. By using existing data points and battery measurements and characteristics, the battery cell temperature may be predicted up to twenty seconds sooner than typical systems using temperature sensors. Because the temperature may be predicted sooner, the temperature control around the battery may be more efficient, thus extending battery life and reducing cooling system size, noise level and cost. Further because battery temperature sensors are not necessary for this estimation, the size and cost of the cooling system may be decreased.

Figure 1:
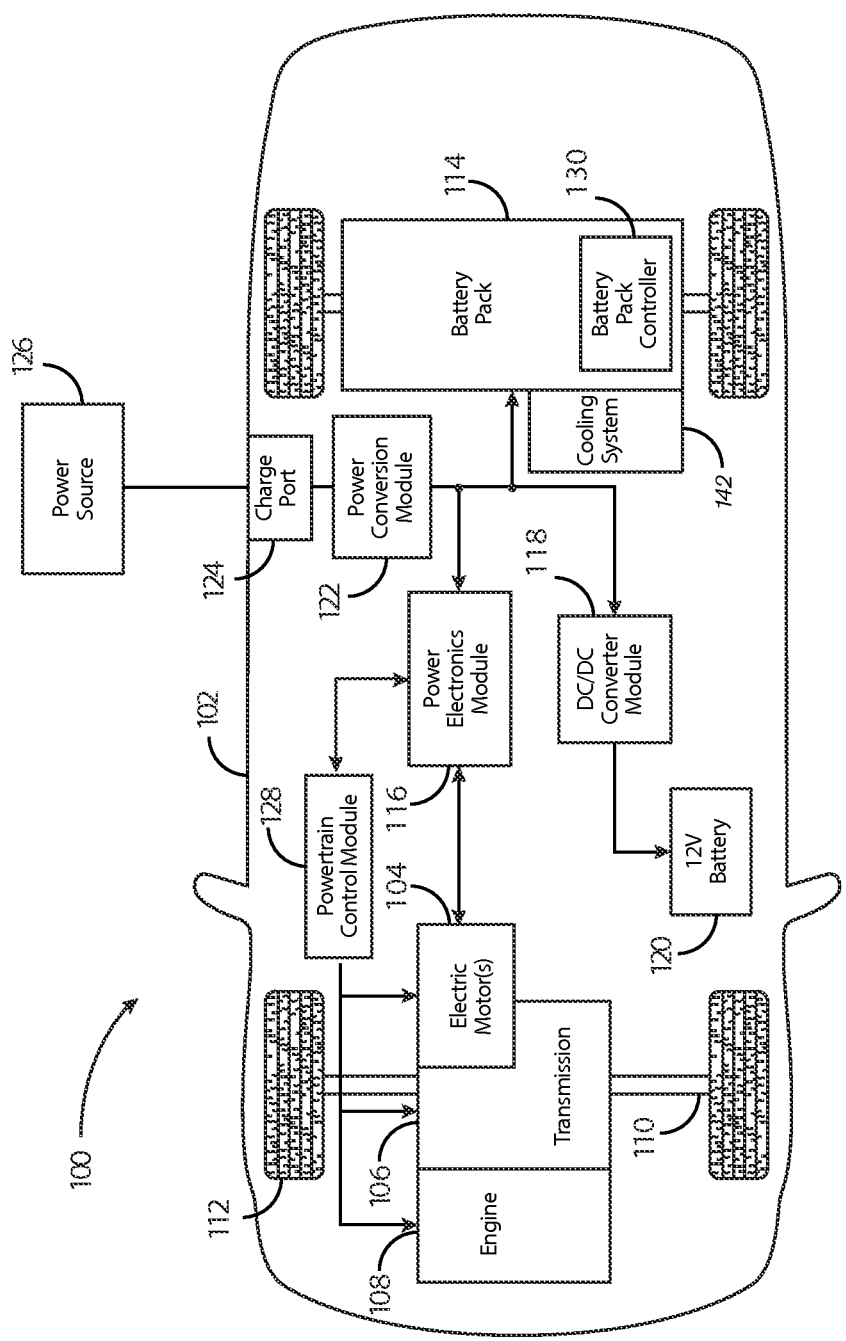
FIG. 1 illustrates an example hybrid-electric vehicle with a battery pack.

FIG. 1 depicts an example of a typical vehicle system 100. A plug-in hybrid-electric vehicle 102 may comprise one or more electric motors 104 mechanically connected to a hybrid transmission 106. In addition, the hybrid transmission 106 is mechanically connected to an engine 108. The hybrid transmission 106 may also be mechanically connected to a drive shaft 110 that is mechanically connected to the wheels 112. The electric motors 104 can provide propulsion when the engine 108 is turned on or off. The electric motors 104 can provide deceleration capability when the engine 108 is turned off or on based on vehicle controller command that may optimize vehicle fuel economy by allowing the engine and motor to achieve the highest efficiency or make the battery pack achieve a desired SOC level. The electric motors 104 may be configured as generators and can provide fuel economy benefits by recovering energy that would normally be lost as heat in the friction braking system. The electric motors 104 may also reduce pollutant emissions since the hybrid electric vehicle 102 may be operated in electric mode under certain conditions and through the optimal process, the engine and electrical drive system may work at the highest available condition.

A battery pack 114 stores energy that can be used by the electric motors 104. A vehicle battery pack 114 typically provides a high voltage DC output. The battery pack 114 is electrically connected to a power electronics module 116. The power electronics module 116 is also electrically connected to the electric motors 104 and provides the ability to bi-directionally transfer energy between the battery pack 114 and the electric motors 104. For example, a typical battery pack 114 may provide a DC voltage while the electric motors 104 may require a three-phase AC current to function. The power electronics module 116 may convert the DC voltage to a three-phase AC current as required by the electric motors 104. In a regenerative mode, the power electronics module 116 will convert the three-phase AC current from the electric motors 104 acting as generators to the DC voltage required by the battery pack 114. The methods described herein are equally applicable to a pure electric vehicle or any other device using a battery pack.

In addition to providing energy for propulsion, the battery pack 114 may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V battery 120. An all-electric vehicle may have a similar architecture but without the engine 108.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric motors and power electronics may be controlled by a powertrain control module (PCM) 128.

The battery pack 114 may also include a battery pack controller 130 (also referred to as a battery electrical control module (BECM)). The batter pack controller 130 may control and monitor the performance of the battery pack 114. The controller 130 may include an electronic monitoring system that manages temperature and charge state of each of the battery cells. The controller 130 may include a processor and a memory configured to facilitate the process 400 described below with respect to FIG. 4. Although not show in detail, the wire harness of the battery pack 114 is used to connect each cell, sensor, and other electrical component electrically together. The wire harness may have a resistance $R_{harness}$ that may affect the heat generated by the battery pack 114 when there is current flow on the wire harness.

In addition to illustrating a plug-in hybrid vehicle, FIG. 1 may also illustrate a battery electric vehicle (BEV), a hybrid electric vehicle (HEV) and a plug-in hybrid electric vehicle (PHEV). The various components discussed may have one or more associated controllers (including the batter pack controller 130) to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (anode) and a negative electrode (cathode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a bus bar, which is part of the battery pack wire harness, and may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the bus bar may contact terminals of all four cells. The battery cells may be parallel/serial hybrid connected, for example, each group of cells may have 5 cells connected in parallel and groups of cells serially connected among cell groups. The purpose of the different configurations of battery cells is to make the battery pack output current and voltage within desired ranges.

The battery pack 114 may be heated and/or cooled using a thermal management system. The thermal management system may include an air cooling system 142, or cooling arrangement, (shown in FIG. 1) such as a fan, an air conditioned air flow, and/or vehicle cabin air. The battery pack 114 may also be liquid cooled, similar to combustion engine liquid cooling systems, with a pump configured to pump liquid coolant to a cooling fin/pad among/around/on the side of the cells to cool the cells. While the cooling system 142 is shown as abutting a portion of the battery pack 114, the cooling system 142 may encapsulate or surround the battery pack 114. The cooling system 142 may also be arranged on another portion of the battery pack 114.

A battery pack temperature, or battery cell temperature, may be used by the controller 130 to operate the cooling system 142. For example, the cooling system 142 may be activated or turned on when the battery pack temperature exceeds a predefined internal temperature threshold. Additionally, a fan within the cooling system 142 may be controlled in response to the battery temperature wherein its speed may increase or decrease in response to the temperature. The air flow temperature, coolant flow rate and coolant temperature may also be adjusted in response to the temperature. The battery temperature may be an estimated battery temperature described herein. The controller 130 may receive a plurality of parameters to determine the estimated battery temperature. The parameters are described in greater detail below with respect to FIG. 2.

Figure 2:
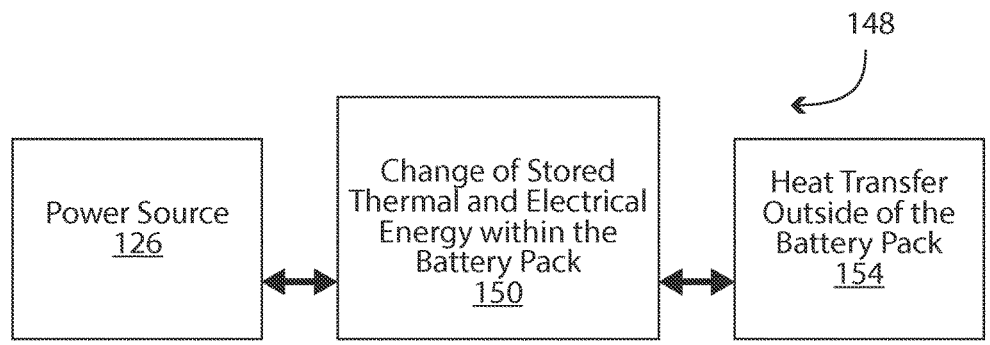
FIG. 2 is a block diagram of battery pack energy exchange components.

FIG. 2 is a block diagram of battery pack energy exchange components 148 showing the energy relationship between the battery pack 114, the external electrical power source 126, and the thermal energy through heat transfer entering the battery pack 114. The battery pack has a balanced power. When the battery pack 114 changes chemical energy to electrical energy, it will generate some heat due to the battery cell internal resistance $R_{bat}$ and battery pack wire harness resistance $R_{harness}$. The electrical energy is then use to move the vehicle and power other vehicle systems. The thermal energy is either transferred outside the battery pack 114 through heat transfer by the cooling system 142 or the battery pack 114 absorbs the thermal energy, thus increasing the battery pack temperature.

When the battery pack 114 is charged by either the vehicle electrical system during break or the external power source 126 (e.g., outside charging station), the battery pack 114 converts most of the electrical energy to chemical energy stored inside the cells. The remaining energy is consumed by the internal resistance $R_{bat}$ and pack wire harness resistance $R_{harness}$ which generates heat that is either transferred outside or stored inside the pack 114. The battery pack components 148 and the battery's power balance may be used to estimate the battery temperature $T_{cell}$ in view of various battery system parameters. The parameters may include known constants, as well as real-time variables. The controller 130 may maintain constants specific to the battery pack 114, as well as receive additional variable parameters in real-time or near real-time. An exemplary list of parameters may include P battery pack power
V battery pack voltage
I battery pack current
$C_{p,pack}$ battery heat capacity
$T_{cell}$ estimated battery temperature
$E_{batpack}$(SOC) battery chemical energy as a function of the state of charge
$T_{air}$ inlet air temperature
h battery heat transfer coefficient
$R_{harness}$ harness resistance
$R_{bat}$ battery pack resistance The external power source 126 may supply power to the battery pack 114. Power is equal to the product of current and voltage as represented in equation 1 below.

$$P = V \cdot I \quad \text{(Eq. 1)}$$

The values of the voltage V, the current I, and power P may be measured by voltage and current sensors and supplied to the controller 130 from the power source 126.

The battery pack 114, represented by block 150 in FIG. 2, stores both thermal and electrical energy. The combination of the thermal and electrical energy is the total packed stored energy of the battery. The change in the packed stored thermal energy may be used to determine the battery temperature.

The stored thermal energy rate may be represented by equation 2 below.

$$\text{stored thermal energy rate} = \frac{d}{dt}[C_{p,pack} \cdot T_{cell}] \quad \text{(Eq. 2)}$$

where $C_{p,pack}$ is the battery pack heat capacity and where $T_{cell}$ is the battery temperature.

The stored electrical energy rate may be represented by equation 3 below.

$$\text{stored electrical energy rate} = \frac{d}{dt}[E_{batpack}(SOC)] \quad \text{(Eq. 3.)}$$

where $E_{batpack}$(SOC) is the battery chemical energy as a function of the state of charge (SOC). The SOC may be the ratio of residual capacity to installed capacity. The SOC may be expressed as a percentage. The controller 130 may estimate the SOC value through the battery pack voltage, current and history data. The SOC may be maintained at the controller through communication with the power source 126, electrical motor(s) 104 and other vehicle components.

The changing rate of the stored battery electrical energy may be equal to the product of the open circuit voltage (OCV) as a function of the state of charge and the current. The open circuit voltage may be the difference of electrical potential between two terminals of the battery pack 114 when there is no current supplied to the battery pack 114. OCV is the stabilized value of the cell open circuit voltage. It can be measured when no current flows to the battery pack 114 over a certain time (for example, 15 seconds). Since in Lithium-ion cells, the OCV value vs. cell state of charge (SOC) may be a fixed curve, the open circuit voltage may be a function of the state of charge and may be determined by the controller 130. The open circuit voltage times the current I equals the change rate in stored chemical/electrical energy of the battery pack 114 as shown in equation 4 below.

$$\frac{d}{dt}[E_{batpack}(SOC)] = OCV(SOC) \cdot I \quad \text{(Eq. 4)}$$

The inlet air to the battery pack 114, represented by block 154, has an inlet air temperature, $T_{air}$, may be measured by a temperature sensor located in the battery pack air flow inlet that determines the fresh inlet temperature. The battery pack 114 may have a heat transfer coefficient h. In one example where the cooling system 142 includes a fan, h may be a function of cooling fan speed. For example, h=0.3404× Coolant Flow Rate+2.1912 (W/K) where Coolant Flow Rate (CFM) may be linear to coolant fan speed. The coolant fan speed may be measured by a fan speed sensor and fed back to the battery controller 130. The battery controller 130 may control the coolant flow rate through the fan speed. The battery temperature $T_{cell}$ may be predicted as explained herein. The rate of heat transfer out of the pack may be represented by equation 5 below.

$$\text{the rate of heat transfer out of pack} = h \cdot (T_{cell} - T_{air}) \quad \text{(Eq. 5)}$$

As electrical current is supplied and drawn from the battery pack 114, the stored electrical energy of the battery will change. Additionally, due to the resistances of the harness $R_{harness}$ and the resistance of battery cells inside the pack $R_{bat}$, heat may be generated. The heat due to the resistances may be represented by equation 6 below.

$$\text{heat generated} = I^2 \cdot (R_{bat} + R_{harness}) \quad \text{(Eq. 6)}$$

The heat generated, plus the stored battery electrical energy (see equation 4), equals the battery power P (see equation 1). Thus $$\text{heat generated + the rate of battery pack stored electrical energy = power input to battery} \quad \text{(Eq. 7)}$$

Making the appropriate substitutions of equations 1, 3, 4 and 6

$$OCV(SOC) \cdot I + I^2 \cdot (R_{bat} + R_{harness}) = V \cdot I \quad \text{(Eq. 8)}$$

Solving for $I^2 \cdot (R_{bat} + R_{harness})$, which is the heat generated $$\text{heat generated} = I^2 \cdot (R_{bat} + R_{harness}) = V \cdot I - OCV(SOC) \cdot I \quad \text{(Eq. 9)}$$

A thermal balancing of the battery pack 114 may require the rate of heat transfer out of the pack (equation 5) to equal the heat generated at the battery pack (equation 9) minus the stored thermal energy at the battery pack (equation 2) as shown below.

$$\text{rate of heat transfer out of pack = heat generated - stored thermal energy} \quad \text{(Eq. 10)}$$

$$h(T_{cell} - T_{air}) = V \cdot I - OCV(SOC) \cdot I - \frac{d}{dt}[C_{p,pack} \cdot T_{cell}] \quad \text{(Eq. 11)}$$

Solving for the numerical solution of equation inside BECM 130, we may obtain $T_{cell}$ Thus, the estimated battery temperature $T_{cell}$ may be determined based on the known heat capacity $C_{p,pack}$ of the battery pack 114, the inlet air temperature $T_{air}$, the battery pack state of charge and the detected currents and voltages.

These detected values may be acquired much faster with delays from real-time being in the millionth of seconds. Battery temperature sensors, on the other hand, may have a 15-30 second delay. Additionally, traditional battery temperature sensors may be installed inside a protected shell of the sensor, measuring the surface temperature of the battery. This surface temperature may be lower than a center of the cell temperature due to the heat transfer between the pack 114 and the surrounding environment. By using the currents and voltages of the battery, a near instantaneous temperature value may be determined. The need for traditional temperature measurements may be eliminated, resulting in a much faster and more accurate temperature estimation.

Figure 3:
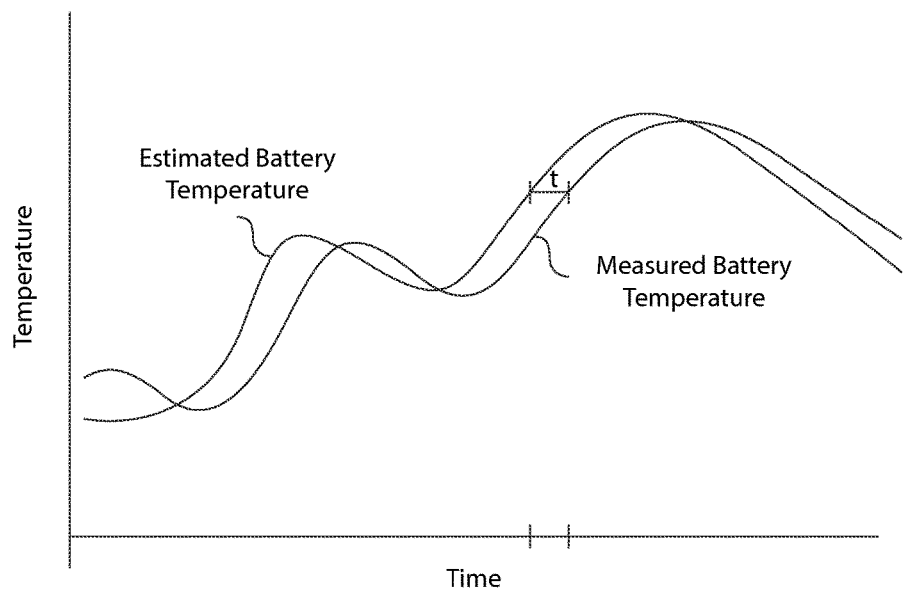
FIG. 3 is an exemplary chart showing the estimated battery temperature and a measured battery temperature.

FIG. 3 is an exemplary chart showing the estimated battery temperature $T_{cell}$ and a measured battery temperature. As shown by the waveforms in the chart, a series of estimated temperatures $T_{cell}$ closely corresponds to a series of measured temperatures, although the estimated temperatures may be realized up to 20 seconds faster than the measured temperatures, as shown as indicated by t in the figure. Thus, the estimated temperatures may be realized faster than traditional temperature measurements and may be used by the thermal management system (specifically the cooling arrangement 142) to more effectively cool the battery pack 114 as needed.

Figure 4:
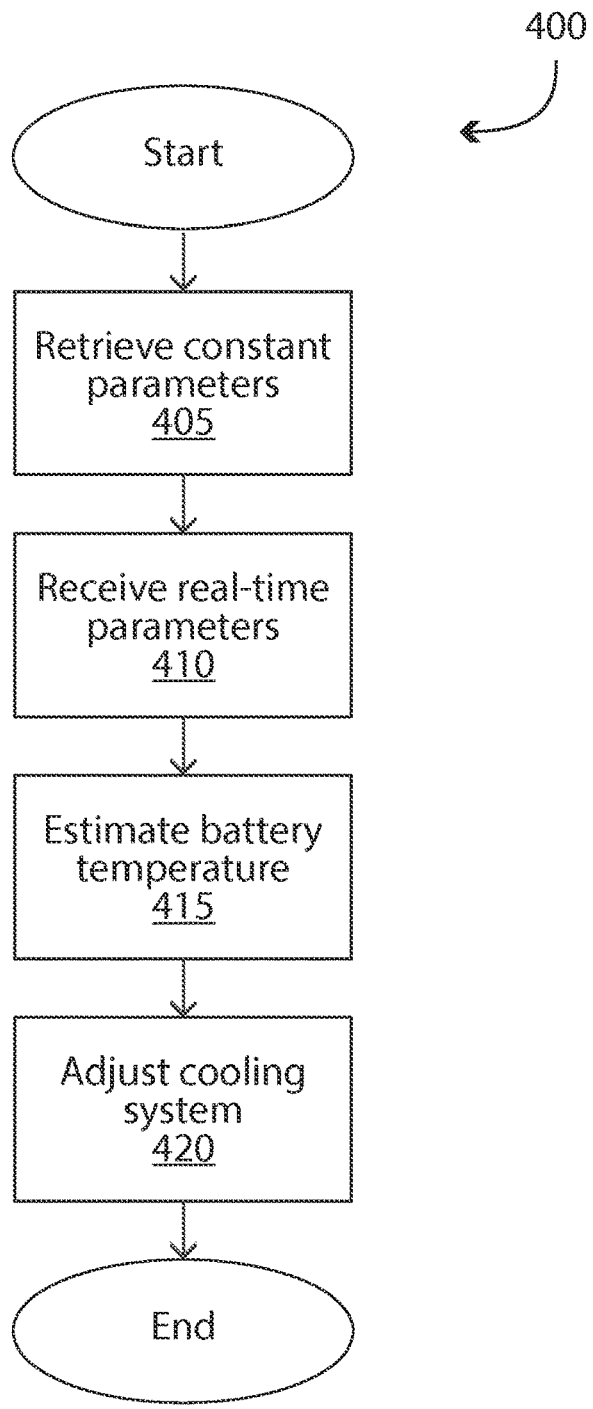
FIG. 4 is an exemplary algorithm for estimating battery temperature.

FIG. 4 is an exemplary process 400 for estimating the battery temperature $T_{cell}$. The process beings at block 405 where the controller 130 retrieves the constant parameters relating to the battery pack 114 such as the battery heat capacity $C_{p,pack}$, the coefficients for battery heat transfer coefficient h, and the harness resistances, $R_{harness}$. The process 400 may proceed to block 410.

At block 410, the controller 130 may receive or calculate real-time parameters, such as the battery pack voltage V, the battery pack current I, the battery heat transfer coefficient h, the battery open circuit voltage (OCV), which may be a function of state of charge (SOC), and the inlet air temperature $T_{air}$. The process 400 may proceed to block 415.

At block 415, the controller 130 may determine the estimated battery temperature $T_{cell}$ using equation 10 and the identified parameters.

At block 420, the controller 130 may adjust the battery cooling system 142 according to the estimated temperature. As explained above, the cooling system 142 may be controlled based on the estimated temperature. For example, the cooling system 142 may be turned on or off. Additionally or alternatively, the fan speed of the cooling system 142 may be adjusted, the pump of a liquid cooling system 142 may be adjusted (e.g., the amount of coolant flow rate adjusted). The battery pack 114 may also be liquid cooled similar to combustion engine liquid cooling systems, with a pump configured to pump liquid coolant to a cooling fin/pad among/around/on the side of the cells to cool the cells. The process 400 may continue to adjust the cooling system 142 based on the estimated temperature. That is, if the estimated temperature changes, the cooling system 142 may adjust accordingly. The process 400 may then end.

Accordingly, a cooling system for a battery may be controlled according to the estimated battery temperature. The estimated battery temperature may be based on several constant and real-time parameters and may be unrelated to a measured temperature, allowing the value for the estimated temperature to be generated much sooner than measured temperatures. The cooling system may react quickly to a change in temperature to reduce the effect that heat may have on the battery, thus increasing the life of the battery.

Further, the need for traditional temperature sensors often placed on the outside of the battery may be eliminated, saving cost.

Computing devices such as the controllers described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, Matlab Simulink, TargetLink, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, EEPROM (Electrically Erasable Programmable Read-Only Memory and is a type of non-volatile memory used in computers and other electronic devices to store small amounts of data that must be saved when power is removed, e.g., calibration tables or device configuration.) optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a traction battery;
   a cooling system configured to cool the traction battery; and
   a controller programmed to operate the cooling system in response to a series of estimated battery temperatures that are each based on heat generation, stored thermal energy, and heat transfer rates associated with the battery and that reflect changes in internal temperature of the battery prior to sensors reflecting changes in internal temperature of the battery to prevent the battery from exceeding an internal temperature threshold.

2. The vehicle of claim 1, wherein the heat generation rate is based on a power of the battery and an open circuit voltage as a function of a state of charge of the battery.

3. The vehicle of claim 1, wherein the heat generation rate is based on a product of a current of the battery and a difference between a voltage of the battery and an open circuit voltage of the battery.

4. The vehicle of claim 1, wherein the stored thermal energy is based on a rate of change of the estimated temperatures of the battery and a heat capacity of the battery.

5. The vehicle of claim 1, wherein the heat transfer rate is based on a difference between a temperature of battery inlet air and the estimated temperatures of the battery.

6. The vehicle of claim 1, wherein operating the cooling system includes activating the cooling system.

7. A vehicle comprising:
   a battery cooling system configured to cool a traction battery; and
   a controller programmed to operate the cooling system in response to a series of estimated battery temperatures that are each based on heat generation, stored thermal energy, and heat transfer rates associated with the battery and that reflect changes in internal battery temperature prior to sensors reflecting changes in internal battery temperature to prevent the battery from exceeding a temperature threshold.

8. The vehicle of claim 7, wherein the heat generation rate is based on a power of the battery and an open circuit voltage as a function of a state of charge of the battery.

9. The vehicle of claim 7, wherein the heat generation rate is based on a product of a current of the battery and a difference between a voltage of the battery and an open circuit voltage of the battery.

10. The vehicle of claim 7, wherein the stored thermal energy is based on a rate of change of the estimated temperatures of the battery and a heat capacity of the battery.

11. The vehicle of claim 7, wherein the heat transfer rate is based on a difference between a temperature of battery inlet air and the estimated temperatures of the battery.

12. The vehicle of claim 7, wherein operating the cooling system includes activating the cooling system.

* * * * *